US008510481B2

(12) United States Patent
Wilson et al.

(10) Patent No.: US 8,510,481 B2
(45) Date of Patent: Aug. 13, 2013

(54) MEMORY ACCESS WITHOUT INTERNAL MICROPROCESSOR INTERVENTION

(75) Inventors: Thomas James Wilson, Pleasanton, CA (US); Yutaka Hori, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1397 days.

(21) Appl. No.: 11/650,118

(22) Filed: Jan. 3, 2007

(65) Prior Publication Data
US 2008/0162835 A1 Jul. 3, 2008

(51) Int. Cl.
G06F 13/28 (2006.01)

(52) U.S. Cl.
USPC .......... 710/22; 710/23; 710/24; 710/25; 710/26; 710/27; 710/28

(58) Field of Classification Search
None
See application file for complete search history.

(56) References Cited

U.S. PATENT DOCUMENTS

| | | | |
|---|---|---|---|
| 4,833,592 A * | 5/1989 | Yamanaka ............... 700/9 |
| 5,428,417 A | 6/1995 | Lichtenstein | |
| 5,483,261 A | 1/1996 | Yasutake | |
| 5,487,172 A | 1/1996 | Hyatt | |
| 5,488,204 A | 1/1996 | Mead et al. | |
| 5,689,654 A | 11/1997 | Kikinis | |
| 5,825,352 A | 10/1998 | Bisset et al. | |
| 5,835,079 A | 11/1998 | Shieh | |
| 5,835,732 A * | 11/1998 | Kikinis et al. ............ 710/303 |
| 5,880,411 A | 3/1999 | Gillespie et al. | |
| 5,920,343 A * | 7/1999 | Watanabe et al. ......... 348/222.1 |
| 5,974,284 A | 10/1999 | Sato et al. | |
| 6,041,400 A * | 3/2000 | Ozcelik et al. ............ 712/35 |
| 6,107,997 A | 8/2000 | Ure | |
| 6,188,391 B1 | 2/2001 | Seely et al. | |
| 6,236,386 B1 | 5/2001 | Watanabe | |
| 6,310,610 B1 | 10/2001 | Beaton et al. | |
| 6,323,846 B1 | 11/2001 | Westerman et al. | |
| 6,493,774 B2 * | 12/2002 | Suzuki et al. ............ 710/100 |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 6,874,043 B2 * | 3/2005 | Treggiden ............... 710/52 |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Henry Tsai
*Assistant Examiner* — Jing-Yih Shyu
(74) *Attorney, Agent, or Firm* — Morrison & Foerster LLP

(57) ABSTRACT

A method and system for accessing a computer system memory without processor intervention is disclosed. In one embodiment, the method includes initiating a predetermined communication protocol between a first device and a second device, the first device including a first processor, a first memory and a first communication interface, the second device including a second processor, a second memory and a second communication interface. The predetermined communication protocol enables an access operation to be performed on the first or second memory without intervention by the first or second processor. In one embodiment, the predetermined communication protocol utilizes a plurality of predefined packet types which are identified by a packet header decoder.

46 Claims, 5 Drawing Sheets

(56) References Cited

U.S. PATENT DOCUMENTS

| | | | |
|---|---|---|---|
| 6,888,536 B2 | 5/2005 | Westerman et al. | |
| 7,015,894 B2 | 3/2006 | Morohoshi | |
| 7,024,633 B1* | 4/2006 | Mann et al. | 715/765 |
| 7,184,064 B2 | 2/2007 | Zimmerman et al. | |
| 7,339,580 B2 | 3/2008 | Westerman et al. | |
| 7,372,485 B1* | 5/2008 | Bodnar et al. | 348/234 |
| 7,663,607 B2 | 2/2010 | Hotelling et al. | |
| 7,880,497 B2* | 2/2011 | Kelem et al. | 326/9 |
| 7,979,766 B2* | 7/2011 | Sharma et al. | 714/748 |
| 2004/0019704 A1* | 1/2004 | Sano et al. | 709/252 |
| 2004/0064542 A1* | 4/2004 | Williams | 709/224 |
| 2005/0247791 A1 | 11/2005 | Sado et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0097991 A1 | 5/2006 | Hotelling et al. | |
| 2006/0197753 A1 | 9/2006 | Hotelling | |
| 2006/0214003 A1* | 9/2006 | Morrow et al. | 235/487 |
| 2007/0028187 A1 | 2/2007 | Katsuyama | |
| 2007/0035564 A1 | 2/2007 | Katsuyama | |
| 2008/0059724 A1* | 3/2008 | Stifter, Jr. | 711/154 |
| 2008/0158172 A1 | 7/2008 | Hotelling et al. | |
| 2008/0158175 A1 | 7/2008 | Hotelling et al. | |
| 2008/0162997 A1 | 7/2008 | Vu et al. | |
| 2009/0033752 A1* | 2/2009 | Bodnar et al. | 348/211.3 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," *CHI '92*, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MEMORY ACCESS WITHOUT INTERNAL MICROPROCESSOR INTERVENTION

FIELD OF THE INVENTION

This disclosure relates generally to electronic devices (e.g., a touch screen device) capable of performing data processing and memory access functions, and more particularly, to a method and system for performing memory access functions without utilizing an internal processor within an electronic device performing the access functions.

BACKGROUND OF THE INVENTION

One example of an electronic device that can perform data processing and memory access functions is a touch surface device typically used as an input device for performing operations in a computer system. Such input devices generate output signals based on user touches of a touch-sensitive surface or panel of the device. The operations generally correspond to moving a cursor and/or making selections on a display screen. Touch pads and touch screens (collectively "touch surfaces") are becoming increasingly popular because of their ease and versatility of operation as well as to their declining price. Touch surfaces allow a user to make selections and move a cursor by simply touching the surface, which may be a pad or the display screen, with a finger, stylus, or the like. In general, the touch surface recognizes the touch and position of the touch and the computer system interprets the touch and thereafter performs an action based on the touch.

Touch pads are well-known and ubiquitous today in laptop computers, for example, as a means for moving a cursor on a display screen. Such touch pads typically include a touch-sensitive opaque panel which senses when an object (e.g., finger) is touching portions of the panel surface. Touch screens are also well known in the art. Various types of touch screens are described in applicant's co-pending patent application Ser. No. 10/840,862, entitled "Multipoint Touchscreen," filed May 6, 2004, which is hereby incorporated by reference in its entirety. As noted therein, touch screens typically include a touch panel, a controller and a software driver. The touch panel is generally a clear panel with a touch sensitive surface. The touch panel is positioned in front of a display screen so that the touch sensitive surface covers the viewable area of the display screen. The touch panel registers touch events and sends these signals to the controller. The controller processes these signals and sends the data to the computer system. The software driver translates the touch events into computer events. There are several types of touch screen technologies including resistive, capacitive, infrared, surface acoustic wave, electromagnetic, near field imaging, etc. Each of these devices has advantages and disadvantages that are taken into account when designing or configuring a touch screen.

Conventional touch surface devices typically include: driver circuitry for providing drive or stimulation signals to one or more electrodes on a touch panel; output sensing circuitry for receiving and processing output signals from the touch panel; and a controller for controlling the driver circuitry and receiving the processed output signals from the output sensing circuitry for performing further processing and performing one or more functions based on the processed output signals. Each of these circuits can include a plurality of devices or modules for performing specific functions. Some or all of these modules may be integrated into one or more integrated circuit chips, e.g., an application specific integrated circuit (ASIC). A more detailed discussion of these circuits can be found, for example, in co-pending and commonly owned application Ser. No. 11/649,998, entitled "Proximity and Multi-Touch Sensor Detection and Demodulation," the entirety of which is incorporated by reference herein, and application Ser. No. 11/650,201, entitled "Channel Scan Logic," the entirety of which is incorporated by reference herein.

The controller typically includes an embedded processor or controller, such as an ARM968 microprocessor, for example, associated peripheral devices (e.g., RAM, ROM, state registers), a data bus, associated interfaces that allow communications between one or more of the devices over the data bus, and at least one input/output (I/O) interface (e.g., a serial peripheral interface) for communicating with external devices, such as a host processor. The embedded processor executes various control and processing functions required by the touch surface device and can communicate with external devices via the I/O interface.

It has been found, however, that an embedded processor can be inefficient in performing certain functions, such as interpreting data and/or command packets and accessing internal and/or external memories, due to the fact that such actions typically require multiple instructions, steps and clock cycles for a processor to perform. Additionally, an embedded processor consumes relatively large amounts of power when performing these operations. Another disadvantage is that if for some reason the embedded processor is not functioning properly, internal memory access may be completely disabled.

SUMMARY OF THE INVENTION

The invention addresses the above and other needs by providing a new method and system that enables a device (e.g., ASIC) to access internal and/or external memories with minimal or no intervention by an internal processor within the device. As used herein, the term "access" includes any function or action that involves reading and/or writing data or instructions to a memory.

In one embodiment, the invention is directed to a data communication protocol, which enables access to the entire memory address space of a device (e.g., an ASIC) through a data communication interface (e.g., serial peripheral interface (SPI)) of the device, with minimal or no intervention from an internal processor, microprocessor or controller (collectively referred to herein as a "processor"). As used herein the term "data" refers to any information, instructions, code, bits or symbols that can be stored and accessed to and from a memory (e.g., RAM, ROM, Flash, registers, etc.).

In one exemplary implementation, the invention is embodied in a computer system utilizing a touch surface input device (e.g., touch screen or touch panel). Controller may be implemented as an ASIC and logic circuitry (e.g., state machines) within the ASIC performs memory access functions with minimal or no intervention from an embedded processor within the ASIC chip. This enables a variety of features such as: downloading executable code from an external memory to internal memory (e.g., RAM) for execution by the embedded processor, initiating code execution by the embedded processor, reading data and/or state registers, and executing various other functions (for example, initiating channel scan sequences, etc.) that would otherwise typically be performed by the embedded processor. Another advantage in this embodiment is that if the embedded processor is inoperative, internal memory can still be accessed through the embedded logic circuitry within the ASIC. Additionally, it has been found that performing some or all of these functions

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention. Furthermore, although embodiments of the present invention are described herein in terms of devices and applications compatible with computer systems and devices manufactured by Apple Computer, Inc. of Cupertino, Calif., such embodiments are illustrative only and should not be considered limiting in any respect.

Figure 1:
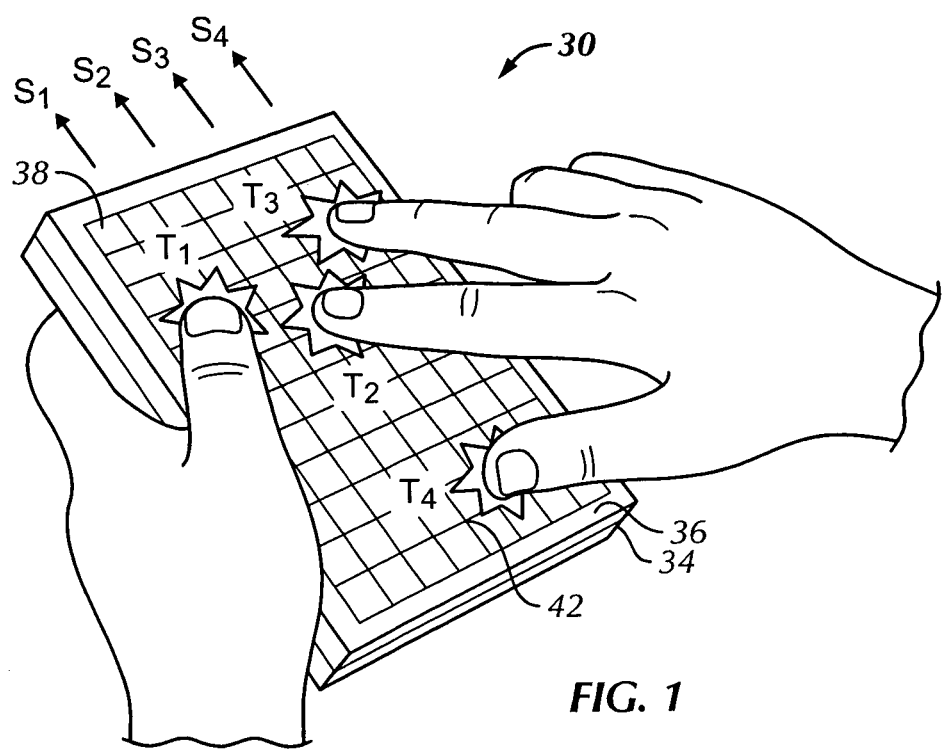
FIG. 1 illustrates an exemplary touch surface device.

FIG. 1 illustrates a touch screen display arrangement 30, which includes a display 34 and a transparent touch screen 36 positioned in front of display 34. Display 34 may be configured to display a graphical user interface (GUI) including perhaps a pointer or cursor as well as other information to the user. Transparent touch screen 36 is an input device that is sensitive to a user's touch, allowing a user to interact with the graphical user interface on display 34. In general, touch screen 36 recognizes touch events on surface 38 of touch screen 36 and thereafter outputs this information to a host device. The host device may, for example, correspond to a computer such as a desktop, laptop, handheld or tablet computer. The host device interprets the touch event and thereafter performs an action based on the touch event.

In one embodiment, touch screen 36 is configured to recognize multiple touch events that occur simultaneously at different locations on touch sensitive surface 38. That is, touch screen 36 allows for multiple contact points T1-T4 to be tracked simultaneously. Touch screen 36 generates separate tracking signals S1-S4 for each touch point T1-T4 that occurs on the surface of touch screen 36 at the same time. In one embodiment, the number of recognizable touches may be about fifteen which allows for a user's ten fingers and two palms to be tracked along with three other contacts. The multiple touch events can be used separately or together to perform singular or multiple actions in the host device. Numerous examples of multiple touch events used to control a host device are disclosed in U.S. Pat. Nos. 6,323,846; 6,888, 536; 6,677,932; 6,570,557, and co-pending U.S. patent application Ser. Nos. 11/015,434; 10/903,964; 11/048,264; 11/038,590; 11/228,758; 11/228,700; 11/228,737; 11/367,749, each of which is hereby incorporated by reference in its entirety.

Figure 2:
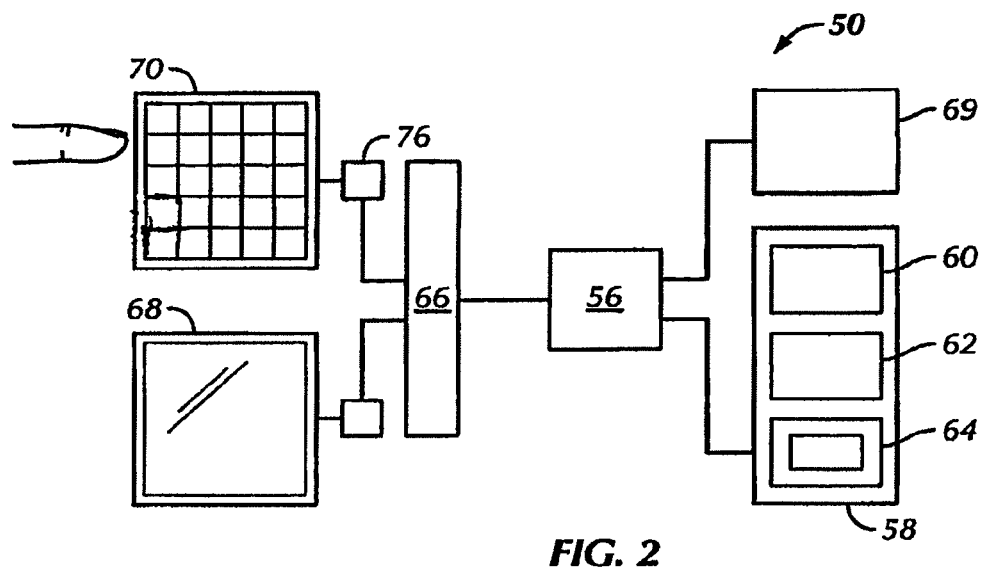
FIG. 2 is a block diagram of a computing device or system incorporating a touch surface device, in accordance with one embodiment of the invention.

FIG. 2 is a block diagram of a computer system 50, employing a multi-touch touch screen. Computer system 50 may be, for example, a personal computer system such as a desktop, laptop, tablet, handheld computer, mobile telephone, digital audio and/or video player, etc. The computer system could also be a public computer system such as an information kiosk, automated teller machine (ATM), point of sale machine (POS), industrial machine, gaming machine, arcade machine, vending machine, airline e-ticket terminal, restaurant reservation terminal, customer service station, library terminal, learning device, etc.

Computer system 50 includes a processor 56 configured to execute instructions and to carry out operations associated with the computer system 50. Computer code and data required by processor 56 are generally stored in storage block 58, which is operatively coupled to processor 56. Storage block 58 may include read-only memory (ROM) 60, random access memory (RAM) 62, hard disk drive 64, and/or removable storage media such as CD-ROM, PC-card, floppy disks, and magnetic tapes. Any of these storage devices may also be accessed over a network. Computer system 50 also includes a display device 68 that is operatively coupled to the processor 56. Display device 68 may be any of a variety of display types including liquid crystal displays (e.g., active matrix, passive matrix, etc.), cathode ray tubes (CRT), plasma displays, etc.

Computer system 50 may include a first input device 69, such as a keyboard or key pad, as well as a touch screen 70, which is operatively coupled to the processor 56 by I/O controller or interface 66 and touch screen controller 76. (The I/O controller 66 may be integrated with the processor 56, or it may be a separate component.) The touch screen 70 is typically a transparent panel that is positioned in front of the display device 68, and may be integrated with the display device 68 or it may be a separate component. Touch screen 70 is configured to receive input from a user's touch and to send this information to the processor 56. In most cases, touch screen 70 recognizes touches and the position and magnitude of touches on its surface.

The host processor 56 receives outputs from the touch screen controller 76 and performs actions based on the outputs. Such actions may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

The host processor 56 may also perform additional functions that may not be related to MT panel processing, and may be coupled to program storage 58 and the display device 68 such as an LCD display for providing a user interface (UI) to a user of the device. In one embodiment, the computer system 50 may be a single device, such as a laptop computer, Apple Ipod™ music/video player, or cellular telephone, having all of the components/modules illustrated in FIG. 2 contained within a single housing of the device.

Figure 3A:
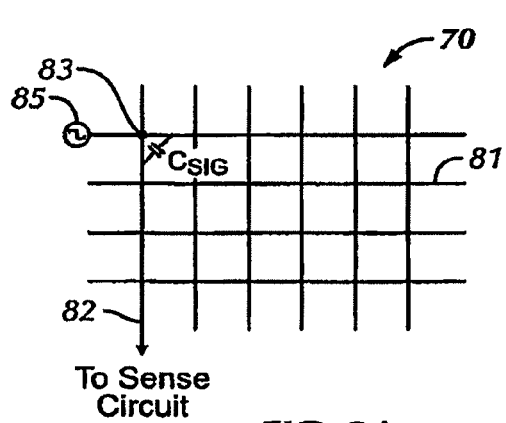
FIGS. 3A and 3B illustrate two possible arrangements of drive and sense electrodes in a touch screen panel, in accordance with two embodiments of the invention.
Figure 3B:
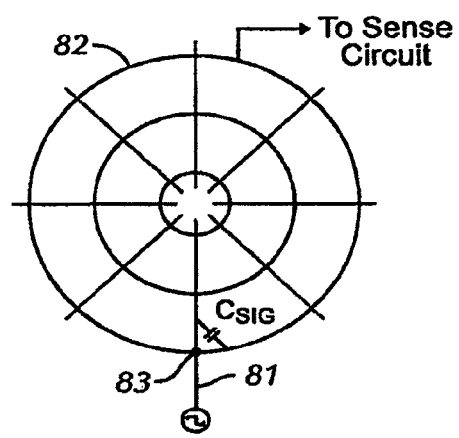

In one embodiment, the touch screen panel 70 can be implemented as a mutual capacitance device constructed as described below with reference to FIGS. 3A and 3B. In this embodiment, the touch screen panel 70 is comprised of a two-layered electrode structure, with driving lines or electrodes on one layer and sensing lines or electrodes on the other. In either case, the layers are separated by a dielectric material (not shown). In the Cartesian arrangement of FIG. 3A, one layer is comprised of N horizontal, preferably equally spaced row electrodes 81, while the other layer is comprised of M vertical, preferably equally spaced column electrodes 82. In a polar arrangement, illustrated in FIG. 3B, the sensing lines may be concentric circles and the driving lines may be radially extending lines (or vice versa). As will be appreciated by those skilled in the art, other configurations based on a variety of coordinate systems are also possible. Additionally, it is understood that the invention is not necessarily limited to touch surface devices utilizing mutual capacitance sensing nodes. The invention may be implemented within other types of touch surface devices such as "self capacitance" devices, for example.

Each intersection 83 represents a pixel and has a characteristic mutual capacitance, $C_{SIG}$. A grounded object (such as a finger) that approaches a pixel 83 from a finite distance shunts the electric field between the row and column intersection, causing a decrease in the mutual capacitance $C_{SIG}$ at that location. In the case of a typical sensor panel, the typical signal capacitance $C_{SIG}$ is about 1.0 picofarads (pF) and the change ($\Delta C_{SIG}$) induced by a finger touching a pixel, is about 0.10 pF. These capacitance values are exemplary only and should not in any way limit the scope of the present invention.

The electrode material may vary depending on the application. In touch screen applications, the electrode material may be ITO (Indium Tin Oxide) on a glass substrate. In a touch tablet, which need not be transparent, copper on an FR4 substrate may be used. The number of sensing points 83 may also be widely varied. In touch screen applications, the number of sensing points 83 generally depends on the desired sensitivity as well as the desired transparency of the touch screen 70. More nodes or sensing points generally increases sensitivity, but reduces transparency (and vice versa).

During operation, each row electrode (i.e., drive electrode) is sequentially charged by driving it with a predetermined voltage waveform 85 (discussed in greater detail below). The charge capacitively couples to the column electrodes (i.e., sense electrodes) at the intersections between the drive electrode and the sense electrodes. In alternative embodiments the column electrodes can be configured as the drive electrodes and the row electrodes can be configured as the sense electrodes. The capacitance of each intersection 83 is measured to determine the positions of multiple objects when they touch the touch surface. Sensing circuitry monitors the charge transferred and time required to detect changes in capacitance that occur at each node. The positions where changes occur and the magnitude of those changes are used to identify and quantify the multiple touch events.

Figure 4:
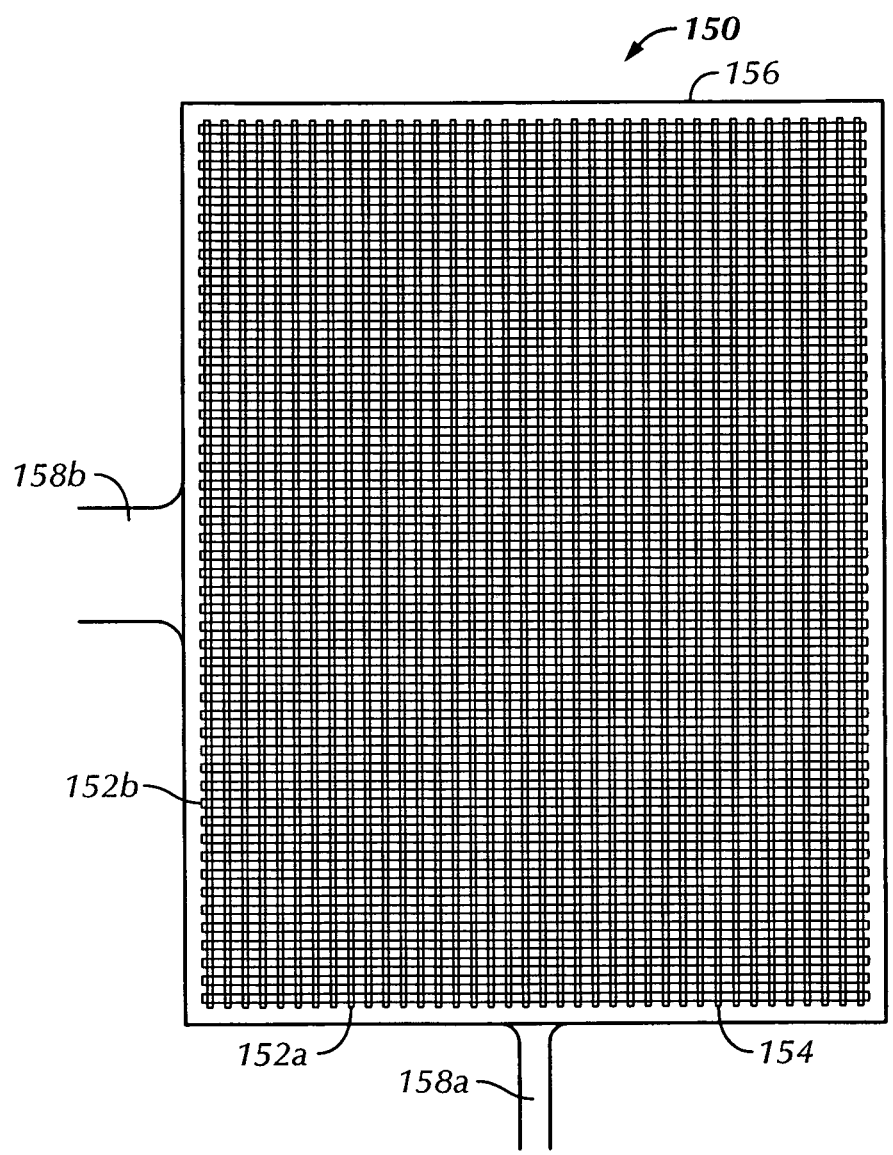
FIG. 4 illustrates a transparent multipoint touch screen, in accordance with one embodiment of the present invention.

FIG. 4 is a top view of a transparent multipoint touch screen 150, in accordance with one embodiment of the present invention. As shown, the touch screen 150 includes a two layer grid of spatially separated lines or wires 152. In most cases, the lines 152 on each layer are parallel to one another. Furthermore, although in different planes, the lines 152 on the different layers are configured to intersect or cross in order to produce capacitive sensing nodes 154 (a.k.a., "pixels"), which each represent different coordinates in the plane of the touch screen 150. The nodes 154 are configured to receive capacitive input from an object touching the touch screen 150 in the vicinity of the node 154. When an object (e.g., a finger tip) is proximate the node 154, the object steals charge thereby affecting the capacitance at the node 154. It has been found that as a finger is pressed more firmly against the touch screen surface 150, the surface area of the finger touching the touch screen 150 increases and a greater amount of charge is diverted away from the underlying sensing node(s) 154.

The lines 152 on different layers serve two different functions. One set of lines 152A drives a current therethrough while the second set of lines 152B senses the capacitance coupling at each of the nodes 154. In one embodiment, the top layer provides the driving lines 152A while the bottom layer provides the sensing lines 152B. The driving lines 152A are connected to a voltage source (not shown) that separately drives the current through each of the driving lines 152A. That is, the stimulus is only happening over one driving line while all the other driving lines are grounded. They may be driven similarly to a raster scan. Each sensing line 152B is connected to a capacitive sensing circuit (not shown) that senses a charge and, hence, capacitance level for the sensing line 152B.

When driven, the charge on the driving line 152A capacitively couples to the intersecting sensing lines 152B through the nodes 154 and the capacitive sensing circuits sense their corresponding sensing lines 152B in parallel. Thereafter, the next driving line 152A is driven, and the charge on the next driving line 152A capacitively couples to the intersecting sensing lines 152B through the nodes 154 and the capacitive sensing circuits sense all of the sensing lines 152B in parallel. This happens sequentially until all the lines 152A have been driven. Once all the lines 152A have been driven, the sequence starts over (continuously repeats). As explained in further detail below, in one embodiment, the capacitive sensing circuits are fabricated on an application specific integrated circuit (ASIC), which converts analog capacitive signals to digital data and thereafter transmits the digital data over a serial bus to a host controller or microprocessor for processing.

The lines 152 are generally disposed on one or more optical transmissive members 156 formed from a clear material such as glass or plastic. By way of example, the lines 152 may be placed on opposing sides of the same member 156 or they may be placed on different members 156. The lines 152 may be placed on the member 156 using any suitable patterning technique including for example, deposition, etching, printing and the like. Furthermore, the lines 152 can be made from any suitable transparent conductive material. By way of example, the lines may be formed from indium tin oxide (ITO). The driving lines 152A may be coupled to the voltage source through a flex circuit 158A, and the sensing lines 152B may be coupled to the sensing circuits via a flex circuit 158B. The sensor ICs may be attached to a printed circuit board (PCB).

The distribution of lines 152 may be widely varied. For example, lines 152 may be positioned almost anywhere in the plane of touch screen 150. The lines 152 may be positioned randomly or in a particular pattern about the touch screen 150. With regards to the latter, the position of the lines 152 may depend on the coordinate system used. For example, the lines 152 may be placed in rows and columns for Cartesian coordinates or concentrically and radially for polar coordinates. When using rows and columns, the rows and columns may be placed at various angles relative to one another. For example, they may be vertical, horizontal or diagonal.

Figure 5:
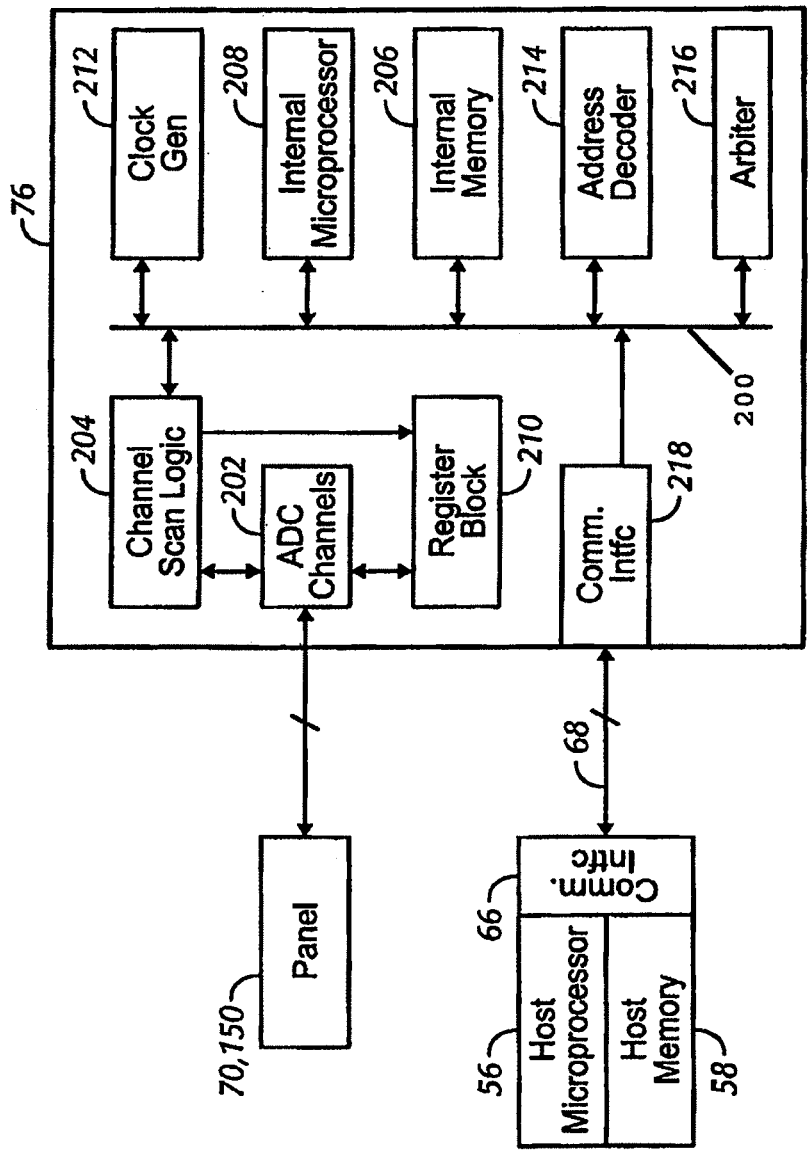
FIG. 5 is a block diagram of a controller having a communication interface that implements a packet communication protocol to access internal and external memories, in accordance with one embodiment of the present invention.

FIG. 5 is a block diagram illustrating various components of the controller 76 (FIG. 2) configured for receiving and processing output sense signals from a touch surface device, in accordance with one embodiment of the invention. The controller 76 includes a data bus 200 through which all internal devices or modules communicate. A plurality of analog-to-digital conversion (ADC) channels 202 are coupled to the column (sense) electrodes 82 (FIG. 3A) of the panel 70, for receiving sensed output signals (e.g., $Q_{SIG}$ or $Q_{SIG}-\Delta Q_{SIG}$) from each respective sense line 82, which are indicative of touch or no-touch conditions on the panel 70. The coupling of sense electrodes 82 to the ADC channels 202 may be implemented by a flex circuit 158B (FIG. 4), for example. The ADC channels 202 convert the analog sensed signals from the panel into digital signals having a predetermined digital format and, thereafter, provide the digital signals to a channel scan logic block 204 for further processing.

Each ADC channel 202 may have one or more sense lines 82 coupled to the channel 202. In one embodiment, the plurality of ADC channels 202 includes twelve ADC channels each having a two-to-one multiplexer (not shown) at its input for multiplexing two sense line inputs received from flex circuit 158B. Thus, twenty-four sense lines 82 may be coupled to twelve ADC channels by means of a two-to-one multiplexer located at each channel 202 input. Furthermore, in one embodiment, the plurality of ADC channels 202 each include a charge amplifier (not shown) at its input stage and further provides for output signal compensation, elimination of stray capacitance effects, and mixing for improved signal-to-noise ratios, among other functions. A more detailed discussion of the ADC channels 202 and related circuitry can be found in co-pending and commonly owned application Ser. No. 11/650,038, entitled "Minimizing Mismatch During Compensation," the entirety of which is incorporated by reference herein.

The channel scan logic module 204 receives the digital signals from the ADC channels 202 and stores them as scan results data in internal memory 206. Depending on application and system requirements, the internal memory 206 may include any one or more of a plurality of data storage devices and types (e.g., RAM, ROM, Flash, etc.) that are well known in the art. However, for purposes of simplicity, internal memory 206 is illustrated and discussed herein as a generic, single memory module. When scan results data has been stored for at least one scan of all drive electrodes 81 of the panel 70, the resulting panel "image" is processed by an internal microprocessor 208 to determine whether a touch or multi-touch condition is present on the panel 70. In one embodiment, the channel scan logic module 204 can access internal memory 206 (e.g., RAM), autonomously read data from the ADC channels 202, and provide control for the ADC channels 202. This control may include multiplexing column/sense electrodes of the panel 70 to the ADC channels 202.

The controller 76 further includes a register block or module 210 that contains one or more registers for storing programming and state information used to control timing and operation of the control module 76. A clock generation module 212 provides one or more clock signals to the various modules in the controller 76, as necessary, to provide timing and synchronization to controller operations. An address decoder 214 decodes address signals or packets in order to provide access to corresponding physical addresses or locations within the internal memory 206 to microprocessor 208 and channel scan logic module 204. The controller 76 further includes a bus arbiter 216 for monitoring and controlling access to the data bus 200 by the various modules (e.g., channel scan logic module 204, microprocessor 206, communication interface 218, etc.) contained within the controller 76.

The communication interface 218 allows the controller 76 to communicate with one or more external devices, such as host processor 56, in accordance with a predetermined communication protocol and data format. In various embodiments of the invention discussed in further detail below, communication interface 218 is a serial peripheral interface (SPI) that contains logic circuitry (e.g., state machines or modules) for autonomously interpreting data packets received from the host microprocessor 56 or other external device and performing memory access functions autonomously (i.e., with little or no intervention from the internal microprocessor 208). The host processor 56 controls access to a host memory 58 and communicates with the controller via a host I/O controller or communication interface 66 having one or more input/output (I/O) lines coupling host communication interface 66 with controller communication interface 218. In one embodiment, communication interface 66 is also a host serial peripheral interface (HSPI) 66 that functions in a similar fashion as the controller SPI 218. In this embodiment, communication between HSPI 66 and SPI 218 may be performed in accordance with a full-duplex protocol.

In one embodiment, controller 76 is implemented as an application specific integrated circuit (ASIC) 76 that contains all the modules (202-218) shown in FIG. 5 within a single ASIC chip package. In alternative embodiments, however, the controller 76 may be implemented as two or more ASIC chips that cooperatively work together and communicate via bus 200.

In one embodiment, upon system 50 (FIG. 2) power-on or reset (POR), communication interface 218 allows the control module 76 to boot up with minimal or no intervention (i.e., process steps) performed by the internal microprocessor 208 (FIG. 5). Through a predetermined communication protocol (e.g., packet communication protocol), logic circuitry within the communication interface 218 communicates with an external device, such as host communication interface 66 (FIG. 5), and requests boot program code stored in external memory, such as host memory 58, to be downloaded to internal memory 206 for subsequent execution by the internal microprocessor 208.

In one embodiment, the exchange of commands and program data between the communication interface 218 and the host communication interface 66 is performed in accordance with a predetermined packet communication protocol. The logic modules within the communication interface 218 are configured to autonomously identify and interpret different packet types and perform specified operations in accordance with the packet types received. After completion of downloading of the boot program code into internal memory 206, the internal microprocessor 208 can be configured to initiate execution of the boot program beginning at a pre-specified location of the internal memory 206. This boot-up packet protocol reduces system start up time and associated power consumption because the internal microprocessor 208 is not needed to access and download the boot program from the external memory 58. Additionally, since the boot program is stored in external memory, memory size and type requirements for internal memory 206 can be significantly reduced. For example, it is typically desired to store executable code in reprogrammable, non-volatile memory (e.g., Flash memory). However, adding such internal non-volatile memory to the control module 76 would significantly add to its manufacturing costs. Therefore, in this embodiment, since the boot program is stored in-external non-volatile memory (e.g., host memory 58), which is already present in the system for other purposes, there is no need for additional Flash or other type of non-volatile memory in the controller 76.

As explained in further detail below, in further embodiments of the invention, the host processor 56 or other external device can perform read, write and read-modify-write operations (collectively, "access operations") to and from the internal memory 206, via communication interfaces 66 and 218, with minimum or no intervention by the internal processor 208. The host communication interface 66 communicates with logic circuitry within the controller communication interface 218 in accordance with a predetermined packet communication protocol. The logic module(s) within the communication interface 218 autonomously interpret commands and addresses sent by the host communication interface 66, based on decoded packet types and thereafter performs corresponding access operations to and from the internal memory 206.

Figure 6:
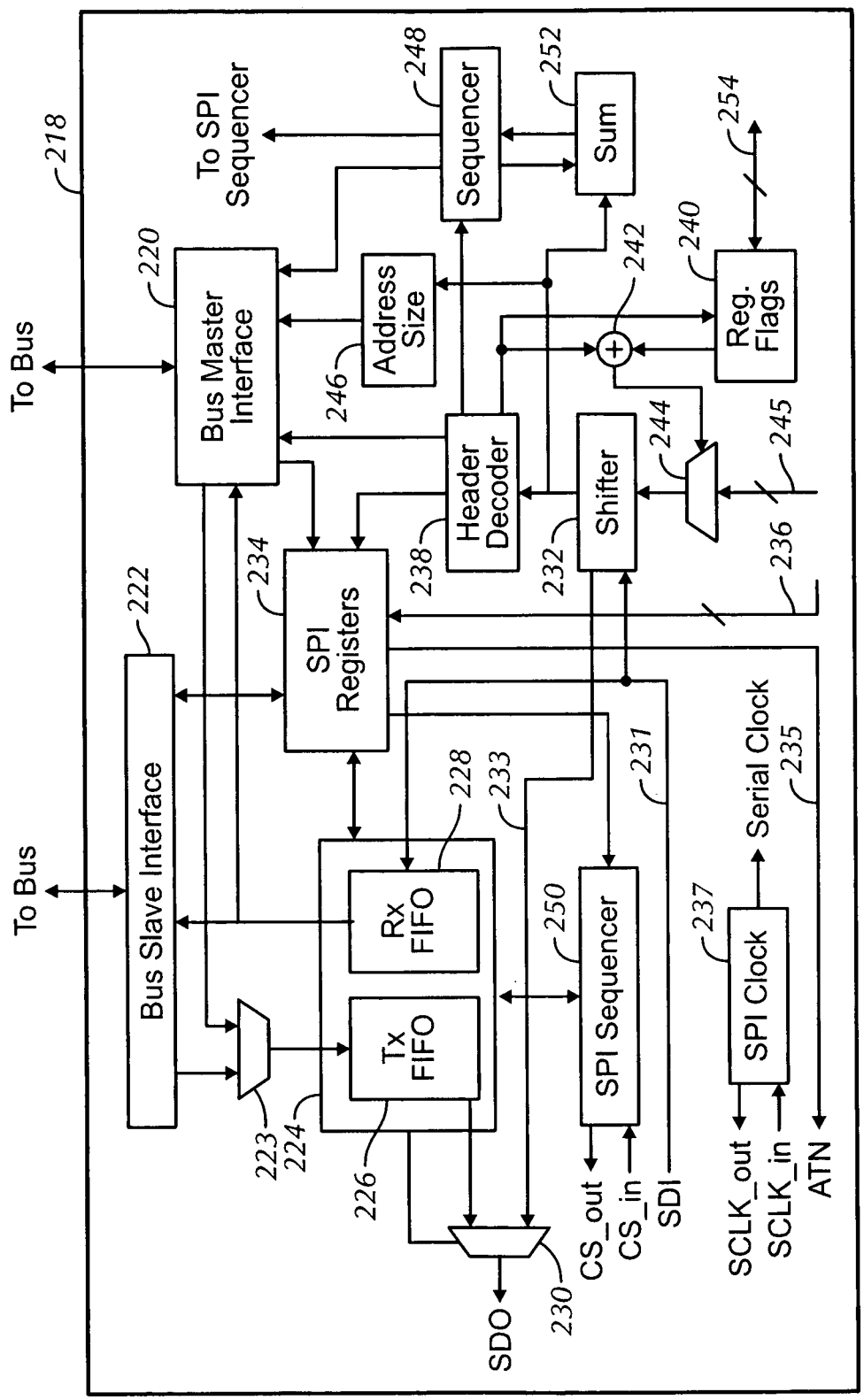
FIG. 6 is a block diagram of a serial peripheral interface that implements a packet communication protocol to perform memory access operations, in accordance with one embodiment of the present invention.

FIG. 6 illustrates a block diagram of communication interface 218 implemented as an exemplary serial peripheral interface (SPI) 218, in accordance with one embodiment of the invention. The SPI 218 includes a Bus Master Interface 220 for communicating with a Master device (not shown) when the controller 76 containing the SPI 218 is operating in a Slave mode. A Bus Slave Interface 222 serves as an interface for communicating with Slave device, e.g., a FIFO memory or SPI registers, when the controller 76 is operating in a Master mode.

The SPI 218 further includes a memory 224 that includes a first-in-first-out (FIFO) storage device 226 (TX FIFO 226) for storing data to be transmitted to an external device or module (not shown) and a FIFO storage device 228 (RX FIFO 228) for storing data received via data input line 231. A multiplexer 230 has a first input connected to an output of the FIFO 226 and a second input coupled to an output line 233 of a shifter 232, which receives data from multiplexer 244 and shifts this data out to an external device (e.g., host 56) via multiplexer 230. The TX FIFO 226 can receive data to be stored and transmitted from either the master or slave interfaces 220 or 222, respectively, via a multiplexer 223.

A SPI register block or module 234 includes one or more registers for storing programming and state values, which are utilized by the SPI 218 to control timing and operation of its modules. The SPI register block 234 further includes an attention (ATN) line 235 coupled to an I/O line of an external device. When the controller 76 wishes to initiate communications with the external device, appropriate registers are programmed within the SPI register block 234 and the ATN line 235 is set either high or low. The external device senses the high or low state of the ATN line 235 and initiates a predetermined packet communication protocol. The SPI register block 234 further includes one or more input lines 236 for receiving register programming data from other devices of within the controller 76. A SPI clock module 237 further generates a serial clock for use by the various modules of the SPI 218 to synchronize and clock its internal operations when the SPI 218 is operating in a Master mode.

The shifter 232 also receives commands and/or control data (e.g., REQ_BOOT, ACK_WAKEUP, etc.) from multiplexer 244 and shifts the commands and/or control data out to an external device via output line 233 and multiplexer 230. The shifter 232 further includes a second output coupled to the input of packet header decoder 238, which decodes packets received from an external device in accordance with a predetermined packet format and protocol and thereafter updates appropriate register flags in register flags module 240. If the packet decoded by the header decoder 238 is a command packet, the header decoder 238 further sends the decoded header information to micro-sequencer 248, which is programmed or configured to execute microinstructions corresponding to the command. The micro-sequencer 248 further includes an output coupled to SPI sequencer 250 for synchronizing SPI microinstructions with operations performed by the external device (e.g., host processor 56).

In one embodiment, when operating in either a Master or Slave mode, the SPI 218 can receive or transmit data packets containing one or more frames, each frame containing a plurality of bits (e.g., 8, 16 or 32 bits) of data. The FIFO memories 226 and 228 can support burst and/or direct memory access (DMA) transfers of a plurality of bytes (e.g., 16 bytes). Additionally, the SPI 218, via Bus Master and Slave Interfaces 220 and 222, respectively, can support read request, write request, read-modify-write request and/or sequence memory request commands received from an external device. These commands are discussed in further detail below.

A register flag module 240 stores various register flag bits that are set or reset in order to indicate a current state or operation being performed. The register flag module 240 includes a plurality of I/O lines for transmitting and receiving register flag set/reset information to and from an external device. This register flag set/reset information is used to control SPI 218 operations and synchronize them with operations performed by the external device. Another output of the register flag module 240 is summed with an output of the packet header decoder 238 via summing circuit 242. The output of the summing circuit 242 is a selection control signal provided to multiplexer 244. Depending on the selection control signal, the multiplexer 244 will provide an appropriate packet (e.g., command, request, acknowledgement or status packet) to the shifter 232 for transmission out to an external device, as discussed above. In one embodiment, the multiplexer 244 selectively provides a plurality of control signals (e.g., REQ-BOOT, ACK_WAKEUP, NAK_NA, NAK_ERR, ACK_WR-REQ, ACK_DATA, NOP) via one or more input lines 245 and provides them selectively one at a time to the shifter 232. In one embodiment, the plurality of control signals are stored as constants in a memory, e.g., ROM or a table, having a plurality of outputs coupled to corresponding input leads or traces of the multiplexer 244.

An address/size module 246 is used to latch address and size frames received from the shifter 232. The address indicates a memory location to be accessed to perform read, write or read-modify-write operations. The size information indicates the amount of data involved (e.g., no. of bytes or frames) in the operation. The address and size frames are also provided to a check sum circuit 252 having an input and output coupled to the micro-sequencer 248 for performing data integrity operations.

In one embodiment of the invention, upon power-up or reset of the controller 76, the internal microprocessor (e.g., an ARM968 processor) executes a single "Wait for Interrupt" (WFI) instruction. Thereafter, the SPI 218 is automatically configured to implement a predetermined packet communication protocol on top of the known standard SPI protocol without intervention by the internal microprocessor 208. In one embodiment, the predetermined packet communication protocol allows access to any system 50 memory through packetized boot request, memory read, write and/or read-modify-write operations, as well as a packetized mechanism for moving large data images to auto-incremented address locations on the data bus 200 (e.g., similar to a DMA operation).

Through a packetized boot request protocol and mechanism, logic circuitry within the SPI 218, as described above, can access a boot program (e.g., code and/or firmware) from external memory 58 and load the boot program into internal memory 206, without intervention by the internal microprocessor 208. After the boot program has been loaded into the internal memory 206, and appropriate register states and flags have been set, the internal processor 208 wakes up and begins executing boot program instructions from a pre-specified location in the internal memory 206.

In one exemplary implementation, upon power-on or reset, a power manager module (not shown) contained within the controller 76 sends a power manager boot request signal (PMgr_BootReq) to the SPI register block 234 via input line 236. The PMgr_BootReq command packet is also sent to the register flags module 240 via one of the plurality of I/O lines 254. The PMgr_BootReq signal sets a BootReq flag (not shown) within the register flags module 240. Upon setting of the BootReq flag, a boot request command (REQ_BOOT) is loaded from a SPI memory, e.g., a ROM or table (not shown), into the shift register or shifter 232. The PMgr_BootReq signal also sets appropriate state registers within the SPI Registers module 234, which in turn causes the ATN line 235 to be pulled low. The ATN line 235 is coupled to one of the plurality of I/O lines 68 (FIG. 5) used for transmitting data and commands between the host serial peripheral interface (HSPI) 66 (FIG. 5) and the SPI 218. In one embodiment, the I/O lines 68 support and provide full-duplex communication channels between the HSPI 66 and the SPI 218.

The HSPI 66 responds to the ATN signal by sending an acknowledgement command (ATN_ACK) packet back to the SPI 218 via I/O lines 68 and data input line 231. At the same time, the SPI 218 sends the REQ_BOOT command packet to the HSPI 66 via output line 233 and multiplexer 230. The shifter 232 sends at least a header portion of the ATN_ACK packet to the packet header decoder 238 and then the decoded signal is sent to the register flag module 240. Appended to or following the ATN_ACK packet are frames containing size information which are transmitted from the HSPI 66 to the shifter 232, which are subsequently transmitted to the header decoder 238, the SPI registers 234 and the address/size registers 246, as described above. Based on the size information (e.g., number of frames being transmitted), the SPI 218 transmits a corresponding number of "no operation" (NOP) commands, thereby pulling the corresponding number of boot program frames or packets from the external memory 58 via HSPI 66, in accordance with a full-duplex communication protocol. The boot program frames are error checked and then loaded into the internal memory 206 for execution by the internal processor 208. In this way, a boot operation is performed by a packet-based communication protocol executed entirely by the logic modules in the SPI 218, without intervention by the internal processor 208.

As mentioned above, in further embodiments, the SPI 218 can perform additional memory access operations such as read, write and read-modify-write operations to the internal memory 206, utilizing a packet-based communication protocol without intervention by the internal microprocessor 208.

To perform a read operation, for example, HSPI 66 sends a memory read request (REQ_MEMRD) command packet to the SPI 218. In one embodiment, a memory read address and checksum value is sent with or appended to this command. If the communication protocol is a full-duplex protocol, SPI 218 will send an appropriate number of NOP frames back to the HSPI 66. The command packet is decoded by header decoder 238 and the micro-sequencer 248 starts executing microinstructions for the command. A checksum operation is performed on the address and size data and if data integrity is verified, the address and size data is latched to address/size register 246. The micro-sequencer 248 generates and provides a read command to the master interface 220. At the same time the address/size latch 246 provides the read address and number of frames to the master interface 220. The master interface then retrieves the data from the designated memory address of the internal memory 206 and stores it within the TX FIFO 226. Thereafter, appropriate register bits are set in the SPI register block 234, which asserts the attention (ATN) signal line to the HSPI 66. The HSPI 66 thereafter transmits an ATN_ACK signal appended with an appropriate number of NOP frames to pull the read data from the TX FIFO 226. In this way, data from the internal memory 206 can be read by the external host processor 56 via a packet-based communication protocol, without intervention by the internal microprocessor 208.

A packet-based communication protocol write operation can be performed in a similar fashion as the read operation described above. In one embodiment, the HSPI 66 sends to the SPI 218 a memory write request command (REQ_MEMWR) appended with a memory write address, an address checksum, the data to be written, and a data checksum. The header of the command is decoded by the header decoder 238 and then the micro-sequencer 248 begins executing micro instructions for the command. Checksum operations are performed as discussed above and if successful, write address and data size information is latched into the address/size register 246. Write data temporarily stored in the RX FIFO 228 is latched into a data register (not shown) within the master interface 220, from where it is subsequently written to the corresponding memory address. Upon completion of the write operations, appropriate registers in SPI register block 234 are set, and the ATN line 235 is asserted to the host processor 56. The host processor 56 thereafter transmits an ATN_ACK packet to pull a write request acknowledgement packet (ACKD_WRREQ) from the SPI 218.

A read-modify-write operation can also be executed by the packet-based communication protocol described herein. In the one embodiment, HSPI 66 sends to the SPI 218 a read-modify-write command packet (REQ_MEMRMW) appended with a memory read/write address, address checksum, data, bit write mask, and data/mask checksum. The command packet is decoded by header decoder 238 and then micro-sequencer 248 starts executing micro instructions for the command. Checksum operations are performed as discussed above and if successful, read/write address and data size information is latched into the address/size register 246, and a read request is presented to the master interface 220 along with the address and size data from the register 246. Retrieved read data is latched into a read register (not shown) within the master interface 220 and mask data is latched to as mask register (not shown) within the master interface module 220. Write data is then retrieved from the RX FIFO 228 and used to update the data in read register using the mask data latched in the mask register. Thereafter, the micro-sequencer 248 presents a write request to the master interface 220 with the address, size and modified data in the read register. Upon completion of the write operations, appropriate registers in SPI register block 234 are set, and the ATN line 235 is asserted to the HSPI 66. The HSPI 66 thereafter transmits an ATN_ACK packet to pull a write request acknowledgement packet (ACKD_WRREQ) from the SPI 218.

In a further embodiment, since the SPI 218 supports memory read, write, and read-modify-write access operations to some or all of the controller's memory map, it is possible to interrogate or modify system and/or register state to determine the cause of any errant functional/firmware operation should it be required. Those of skill in the art can design and implement the appropriate access operations and corresponding logic to perform such debugging operations without undue experimentation.

As illustrated by the exemplary embodiments above, by utilizing a predefined packet and communication protocol, various functions and operations can be performed between two or more devices in a system, with no or minimal intervention by an internal processor within at least one of the devices. In one embodiment, a packet-based communication protocol for performing various access functions and operations without intervention by an internal microprocessor of the device or chip performing the functions, utilizes the following four basic packet types: (1) Command (CMD): defines an action to be taken on the part of the receiver; (2) Data (DT): indicates that a packet having 1 to 16384 Words (4 to 65536 Bytes) are to be transmitted to the receiver; (3) Acknowledge (ACK): indicates that the operation requested by the transmitter has been received and decoded properly; and (4) Results Ready (RDY): indicates that one device (e.g., controller 76) has results (e.g., panel scan data) that are ready to be transmitted to a second device (e.g., host processor 56).

As will be apparent to those of ordinary skill in the art, the format of the packets and packet headers can be implemented in many different ways. For example, in one embodiment, a packet may be formed by a dynamically variable number of frames, each frame containing any desired number of bits (e.g., 8, 16 or 32 bits). The format for the packet header can also be implemented in any number of ways. For example, the packet header may be designed to have sixteen bits designated as bits [15, 14, 13 . . . 0], bit [15] being the most significant bit. In one exemplary embodiment, the most significant bit is set to the value zero and the least significant bit is set to the value one. Bits [14, 13] of the header are an indication of the packet type being transmitted, and bits [12, 11] are the inversion of the packet type. This redundancy assures the packet type will be properly detected. Finally, bits [4, 3] can be used to specify the size of the command packet and, in one embodiment, define the number of contiguous bytes written when the command indicates a memory write or read-modify-write operation, as discussed above. Again for redundancy, bits [2, 1] are used to indicate the inversion of the size field. For other types of packet commands these bits can be ignored and are set to zero.

In one embodiment, the following values of bits [14, 13] correspond to the following packet types: 00 (Command); 01 (Data); 10 (Acknowledge); and 11 (ResultsReady).

In one embodiment, the Command packet is used to either initiate an autonomous action by the host processor 56, or a request from the controller 76 for the host 56 to perform an action on behalf of the controller 76. When the host 56 is autonomously initiating an action, HSPI 66 will assert a chip select signal to SPI sequencer 250 and begin transmitting a corresponding Command packet. When the controller 76 is requesting the host 56 to initiate some action, the SPI 218 will first assert its ATN_line to the HSPI 66, as discussed above, and then the HSPI 66 will respond by transmitting an ATN_ACK command which will in turn "pull" the request from the SPI 218.

Table 1 below provides a list of exemplary command packets and their attributes that may be utilized in various embodiments of the invention. The term "Zephyr2" refers to an exemplary implementation of a controller 76 designed by Apple Computer, Inc. of Cupertino, Calif.

TABLE 1

| Code | Meaning | Initiator | # SPI Frames | Comments |
| --- | --- | --- | --- | --- |
| 000 | NOP | — | 1 | Packet type sent by HSPI or ZSPI |
| 001 | REQ_WAKEUP | HSPI | 1 | Forces Zephyr2 to wakeup and start clocks |
| 010 | ATN_ACK | HSPI | 1 | ATN_de-asserted by ZSPI when this command received |
| 011 | REQ_HACC | HSPI | 1 | Flips the "access mode" of the Host SPI interface from "normal" (used during active Zephyr2 scanning mode when results will be transmitted from zephyr2 to the external host) to "privileged" (used to provide exclusive Host SPI access to Zephyr2 memory space). This is discussed in section 4 below. |
| 100 | REQ_MEMRD | HSPI | 5 | Memory read address and checksum sent with this command |
| 101 | REQ_MEMWR | HSPI | 7 | Memory write address, address checksum, data, and data checksum sent with this command |
| 110 | REQ_MEMRMW | HSPI | 9 | Memory write address, address checksum, data, bit write mask. and data/mask checksum sent with this command |
| 111 | REQ_CAL | HSPI | 1 | Forces Zephyr2 to begin a calibration sequence. Note that the external 32 KHz reference clock, input on CLK_IN, must be running and stable at this time. |
| 111 | REQ_BOOT | ZSPI | 1 | ATN_asserted to interrupt HSPI |

Acknowledge packets are issued by either the host SPI (HSPI) or the controller SPI 218 (e.g., Zephyr2 SPI (ZSPI)) to indicate whether previously transmitted packets were received successfully (or not). When the HSPI 66 desires to send an Acknowledge packet it asserts the CS_in line to SPI sequencer 250 and initiates the transfer of the packet to SPI 218. When SPI 218 desires to transmit an Acknowledge Packet, it will first assert the ATN line 235 to the HSPI 66. When the HSPI 66 issues the subsequent Command Packet with an ATN_ACK command code, SPI 218 will issue the Acknowledge Packet it desires to transmit to the HSPI 66.

After receiving an ATN_signal from SPI 218, the HSPI 66 issues one ATN_ACK command frame, thereby pulling an Acknowledge Packet header from SPI 218 containing an acknowledge read request code (e.g., 1000). When the HSPI interprets the Acknowledge packet header, thereby determining that SPI 218 wishes to transmit memory read result data, for example, it will subsequently issue a corresponding number of NOP command packets to pull the remaining SPI 218 frames containing the memory read data and the data checksum. In one embodiment, if the Acknowledge packet from SPI 218 contains a no acknowledgement error code (e.g., NAK_ERR=1111) then the HSPI 66 will not issue the NOP command packets but will instead re-issue the original memory read command packet.

Table 2 below provides a list of exemplary Acknowledge packets and their attributes that may be utilized in various embodiments of the invention.

TABLE 2

| Code | Meaning | Sent by | # SPI Frames | Comments |
|------|---------|---------|--------------|----------|
| 0000 | NOP | — | 1 | |
| 0001 | Reserved | — | — | |
| 0010 | CAL_DONE | ZSPI | 1 | Indicates that a previously requested calibration sequence has been completed. (Note that a calibration sequence for the LFO and FLL is initiated by HSPI issuing a REQ_CAL command packet to ZSPI. |
| 0011 | Reserved | — | — | |
| 0100 | ACK_WAKEUP | ZSPI | 1 | Indicates Zephyr2 is awake and awaiting HSPI accesses. |
| 0101 | ACK_WRREQ | ZSPI | 1 | Indicates the previously issued Memory Write or Memory Read-Modify Write command from the HSPI to the ZSPI was received successfully. |
| 0110 | Reserved | — | — | |
| 0111 | ACK_DATA | either | 1 | Indicates that the last transmitted data packet was received successfully. From the HSPI this will be issued in response to either a memory read response or Results Packet was received ok. For the ZSPI it will be issued in response to a Data Packet. |
| 1000 | ACK_RDREQ | ZSPI | 4 | Issued by the ZSPI with 32 bits of memory read data in response to a memory read command from the HSPI. (Therefore it also indicates that the original Memory Read command was received and decoded successfully.) |
| 1001 1010 1011 1100 | Reserved | — | — | |
| 1101 | ACK_HACC | ZSPI | 1 | Indicates that the REQ_HACC command has been successful. Note that this packet must be scheduled to be sent by firmware (i.e., by writing this to the ZSPI transmit FIFO: it is not generated by hardware). |
| 1110 | NAK_NA | ZSPI | 1 | Indicates that the Command Packet or Data Packet just received will be ignored since the ZSPI is in exclusive "results packet" mode (see section 4 below. |
| 1111 | NAK_ERR | either | 1 | Issued by either the HSPI or ZSPI to indicate that the last transmitted command or data packet was not received successfully in which case it must be re-transmitted. |

The ResultsReady data packet is issued by the SPI 218 to indicate it is ready to transmit panel scan results received from the touch panel 70 (FIG. 2), for example, to the host processor 56 (FIG. 5). In one embodiment, a sequence of operations can be implemented as follows:

1) Firmware within the controller 76 creates a ResultsReady packet, including a header and checksum, and sets up a direct memory access (DMA) transaction to transmit the data over the SPI 218.

2) SPI 218 asserts the ATN line 235 to the HSPI 66.

3) HSPI 66 responds by transmitting Command packet with an ATN_ACK command code and simultaneously pulls the ResultsReady packet header from the SPI 218.

4) Upon determining that SPI 218 wishes to send results data, HSPI 66 then pulls two more frames from SPI 218 by sending two NOP frames to SPI 218. The first frame SPI 218 contains the number of Bytes in the results data and the second frame contains the inverse (bit by bit) of this number.

5) The HSPI 66 then determines the number of 16 bit frames of results data must be pulled from SPI 218 and then transmits this many NOP command frames to retrieve the results data.

As discussed above, during normal operation, the controller 76 will produce a set of data that represents the results of scanning the touch-sensitive panel 70 (FIG. 2) for user touch and/or no-touch conditions. In one embodiment, the packet-based protocol described above is utilized to transmit the results data over the host interface 66 to the external host processor 56, with minimal or no intervention by the internal microprocessor 208 of the controller 76. Thus, this packet-based protocol provides a mechanism for transferring the results data in an efficient, power-saving and reliable manner by packetizing the results data in a predefined fashion. In one embodiment, the frequency of results packet transfers as well as the amount of data per packet is not predefined and is flexible on a transfer-by-transfer basis.

Thus, as described above, a packet-based communication protocol supports memory access operations to system memory space as well as transferring results to an external device, with minimal or no intervention by an internal processor of a device. In one embodiment, the SPI 218 can be configured to either exclusively allow memory access (e.g., memory read, write, read-modify-write operations), or exclusively allow the transfer of results packets. In one embodiment, after the boot process is completed the external host 56 can set a register state bit within the SPI register block 234 via a register write command. After this bit has been set, only Command packet headers corresponding to the selected mode will be recognized by the header decoder 238. All other Command packets will be ignored.

While various embodiments of the present invention have been described above, it should be understood that they have been presented by way of example only, and not of limitation. For example, although the disclosure is primarily directed at touch surface devices that utilize capacitive sensing, some or all of the features described herein may be applied to other sensing methodologies. Additionally, although embodiments of this invention are primarily described herein for use with touch sensor panels, proximity sensor panels, which sense "hover" events or conditions, may also be used to generate modulated output signals for detection by the analog channels. Proximity sensor panels are described in Applicants' co-pending U.S. application Ser. No. 11/649,998 entitled "Proximity and Multi-Touch Sensor Detection and Demodulation," the entirety of which is incorporated herein by reference. As used herein, "touch" events or conditions should be construed to encompass "hover" events and conditions and "touch surface panels" should be construed to encompass "proximity sensor panels." Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

What is claimed is:

1. A computer system, comprising:
a sensor panel;
a first device configured to receive and process sense signals from the sensor panel, the first device including a first processor, a first memory and a first communication interface; and
a second device, external to the first device, including a second processor, a second memory and a second communication interface, wherein the first and second devices communicate via the first and second communication interfaces implementing a predetermined communication protocol that enables an access operation to be performed on the first memory without intervention by the first processor;
wherein the access operation comprises storing a boot program from the second memory to the first memory; and
wherein the computer system further comprises:
an attention (ATN) line connecting the first communication interface and the second communication interface; and
a power manager module configured to initiate the access operation by generating a power manager boot request signal and transmitting the power manager boot request signal to the first communication interface,
wherein the power manager boot request signal causes a signal on the ATN line to be set to a predetermined state.

2. The computer system of claim 1, wherein the predetermined communication protocol comprises a packet-based communication protocol that includes a plurality of packet types each having a predefined header format.

3. The computer system of claim 2 wherein the first communication interface comprises: a packet header decoder for identifying a packet type corresponding to a packet transmitted between the first and second communication interfaces; and a logic device for executing instructions corresponding to the packet type without intervention by the first processor.

4. The computer system of claim 1 wherein the first communication interface comprises a first serial peripheral interface and the second communication interface comprises a second serial peripheral interface.

5. The computer system of claim 1, wherein the first communication interface further comprises a bus master interface configured to support execution of the access operation and wherein the access operation comprises the second device reading data stored in the first memory.

6. The computer system of claim 1, wherein the first communication interface further comprises a bus master interface configured to support execution of the access operation and wherein the access operation comprises the second device writing data to the first memory.

7. The computer system of claim 1, wherein the first communication interface further comprises a bus master interface configured to support execution of the access operation and wherein the access operation comprises a read-modify-write operation.

8. The computer system of claim 1 wherein the access operation comprises storing processed sense signals into the second memory.

9. The computer system of claim 8 wherein the second device comprises a host device, the second processor comprises a host processor and the second memory comprises a host memory of the system, wherein the host processor receives and further processes the processed sense signals from the first device and executes system functions based on the processed sense signals.

10. The computer system of claim 1 wherein the system is embodied in a mobile telephone.

11. The computer system of claim 1 wherein the system is embodied in a digital audio player.

12. The computer system of claim 1, wherein the first communication interface further comprises a bus master interface configured to support execution of the access operation.

13. The computer system of claim 1, wherein the second communication interface receives the ATN signal and transmits frames containing size information including the number of frames to be transmitted to the first communication interface.

14. The computer system of claim 13, wherein the first communication interface is configured to receive the frames containing size information, decode the size information, and retrieve the boot program from the second memory and store the boot program in the first memory without intervention by the first processor.

15. The computer system of claim 14, wherein the first communication interface generates no operation commands to the first communication interface to retrieve the boot program from the second memory and save the boot program into first memory.

16. The computer system of claim 6, wherein the second communication interface is configured to initiate the access operation by sending a memory write request command to the first communication interface, the memory write request command including a memory write address in the first memory and write data.

17. The computer system of claim 16, further comprising:
a receive first-in-first-out (RX FIFO) storage device configured to store the write data;
a packet header decoder configured to decode the memory write request command; and
a micro-sequencer configured to execute instructions for the memory write request command.

18. The computer system of claim 17, wherein the bus master interface is configured to retrieve the write data from the RX FIFO storage device, store the write data in a data register within the bus master interface, and load the write data to the memory write address in the first memory.

19. The computer system of claim 7, wherein the second communication interface is configured to initiate the access operation by sending a read-modify-write command packet to the first communication interface, the read-modify-write command packet including a read/write address in the first memory and write data.

20. The computer system of claim 19, further comprising:
a receive first-in-first-out (RX FIFO) storage device configured to store the write data;
a packet header decoder configured to decode the read-modify-write command packet; and
a micro-sequencer configured to execute instructions for the read-modify-write command packet and provide a read command to the bus master interface.

21. The computer system of claim 20, wherein the bus master interface is configured to receive the read command, retrieve data stored at the read/write address in the first memory, and store the retrieved data in a read register within the bus master interface.

22. The computer system of claim 21, wherein the data stored in the read register is updated with the write data stored in the RX FIFO.

23. The computer system of claim 22, wherein the micro-sequencer is configured to transmit a write request to the bus master interface.

24. The computer system of claim 23, wherein the bus master interface is configured to receive the write request and load the updated data in the read register to the read/write address in the first memory.

25. A computer system, comprising:
a first device configured to receive and process signals, the first device including a first processor, a first memory and a first communication interface; and
a second device, external to the first device, including a second processor, a second memory and a second communication interface, wherein the first and second devices communicate via the first and second communication interfaces implementing a predetermined communication protocol that enables an access operation to be performed on the first memory without intervention by the first processor;
wherein the first communication interface further comprises a bus master interface configured to support execution of the access operation and wherein the access operation comprises at least one of a read operation, a write operation or a read-modify-write operation;
wherein the second communication interface is configured to initiate the access operation; and
wherein the computer system further comprises:
a packet header decoder configured to decode the access operation; and
a micro-sequencer configured to execute instructions for the decoded access operation and provide commands to the bus master interface.

26. A computer system, comprising:
a first device including a first processor, a first memory and a first communication interface;
a second device, external to the first device, including a second processor, a second memory and a second communication interface, wherein the first and second devices communicate via the first and second communication interfaces implementing a predetermined packet-based communication protocol that utilizes a plurality of packet types each having a predefined header format;
a packet header decoder for identifying a packet type corresponding to a packet transmitted between the first and second communication interfaces; and
a logic device contained within the first communication interface configured to be responsive to the packet type and execute an access operation to be performed on the first memory without intervention by the first processor;

wherein the access operation comprises storing a boot program from the second memory to the first memory; and
wherein the access operation further comprises a read-modify-write operation performed on data stored in the first memory.

27. The computer system of claim 26 wherein the first communication interface comprises a first serial peripheral interface and the second communication interface comprises a second serial peripheral interface.

28. The computer system of claim 26 wherein the access operation comprises the second device reading data stored in the first memory.

29. The computer system of claim 26 wherein the access operation comprises the second device writing data to the first memory.

30. The computer system of claim 26 wherein the logic device comprises a micro-sequencer configured to execute micro-instructions based on the packet type.

31. The computer system of claim 26 wherein the system is embodied in a mobile telephone.

32. The computer system of claim 26 wherein the system is embodied in a digital audio player.

33. A method of accessing a computer system memory, comprising:
  initiating a predetermined communication protocol between a first device and a second device, the first device including a first processor, a first memory and a first communication interface, the second device including a second processor, a second memory and a second communication interface, and
  using the predetermined communication protocol, enabling an access operation to be performed on the first memory without intervention by the first or second processor;
  wherein using the predetermined communication protocol includes identifying a packet header for identifying a packet type corresponding to a packet transmitted between the first and second communication interfaces; and
  in response to the identified packet type executing an access operation to be performed on the first memory without intervention by the first processor;
  wherein the access operation comprises storing a boot program from the second memory to the first memory; and
  wherein the access operation further comprises a read-modify-write operation performed on data stored in the first memory.

34. The method of claim 33 wherein the access operation comprises the second device reading data stored in the first memory.

35. The method of claim 33 wherein the access operation comprises the second device writing data to the first memory.

36. The method of claim 33 wherein the access operation comprises storing processed sense signals received by the first device from a touch surface device into the second memory.

37. A computer system, comprising:
  means for initiating a predetermined communication protocol between a first device and a second device, the first device including a first processor, a first memory and a first communication interface, the second device including a second processor, a second memory and a second communication interface, and
  wherein the predetermined communication protocol utilizes a plurality of packet types each having a predefined header format and enables an access operation to be performed on the first or second memory without intervention by the first processor;
  wherein using the predetermined communication protocol includes means for identifying a packet header for identifying a packet type corresponding to a packet transmitted between the first and second communication interfaces; and
  in response to the identified packet type means for executing an access operation to be performed on the first memory without intervention by the first processor;
  wherein the access operation comprises storing a boot program from the second memory to the first memory; and
  wherein the access operation further corn rises a read-modify-write operation performed on data stored in the first memory.

38. The system of claim 37 further comprising: means for identifying a packet type corresponding to a packet transmitted between the first and second communication interfaces; and means for executing instructions corresponding to the packet type without intervention by the first processor.

39. The system of claim 37 wherein the access operation comprises the second device reading data stored in the first memory.

40. The system of claim 37 wherein the access operation comprises the second device writing data to the first memory.

41. The system of claim 37 wherein the access operation comprises storing processed sense signals received by the first device from a touch surface device into the second memory.

42. A mobile telephone, comprising:
  a sensor panel;
  a first device configured to receive and process sense signals from the sensor panel, the first device including a first processor, a first memory and a first communication interface; and
  a second device, external to the first device, including a second processor, a second memory and a second communication interface, wherein the first and second devices communicate via the first and second communication interfaces implementing a predetermined communication protocol that enables an access operation to be performed on the first memory without intervention by the first processor;
  the first communication interface further comprising:
  a packet header decoder for identifying a packet type corresponding to a packet transmitted between the first and second communication interfaces; and
  a logic device configured to be responsive to the packet type and execute an access operation to be performed on the first memory without intervention by the first processor;
  wherein the access operation comprises storing a boot program from the second memory to the first memory; and
  wherein the access operation further comprises a read-modify-write operation performed on data stored in the first memory.

43. A digital audio player, comprising:
  a sensor panel;
  a first device configured to receive and process sense signals from the sensor panel, the first device including a first processor, a first memory and a first communication interface; and
  a second device, external to the first device, including a second processor, a second memory and a second communication interface, wherein the first and second devices communicate via the first and second communication interfaces implementing a predetermined communication protocol that enables an access operation to be performed on the first memory without intervention by the first processor;

the first communication interface further comprising:

a packet header decoder for identifying a packet type corresponding to a packet transmitted between the first and second communication interfaces; and a logic device configured to be responsive to the packet type and execute an access operation to be performed on the first memory without intervention by the first processor;

wherein the access operation comprises storing a boot program from the second memory to the first memory; and wherein the access operation further comprises a read-modify-write operation performed on data stored in the first memory.

44. A computer system, comprising:

a sensor panel;

a first device configured to receive and process sense signals from the sensor panel, the first device including a first processor, a first memory and a first communication interface; and a second device, external to the first device, including a second processor, a second memory and a second communication interface, wherein the first and second devices communicate via the first and second communication interfaces implementing a predetermined communication protocol that enables an access operation to be performed on the first memory without intervention by the first processor;

wherein the second communication interface is configured to initiate the access operation by sending a memory read request command to the first communication interface wherein the first communication interface further comprises a bus master interface configured to support execution of the access operation and wherein the access operation comprises the second device reading data stored in the first memory;

a packet header decoder configured to decode the access operation; and a micro-sequencer configured to execute instructions for the decoded access operation and provide commands to the bus master interface.

45. The computer system of claim 14, wherein the bus master interface is configured to receive a read command, retrieve the data stored in the first memory, and store the data in a transmit first-in-first-out (TX FIFO) storage device.

46. The computer system of claim 45, wherein the second communication interface is configured to extract the data from the TX FIFO storage device.

* * * * *

UNITED STATES PATENT AND TRADEMARK OFFICE
CERTIFICATE OF CORRECTION

| | | |
|---|---|---|
| PATENT NO. | : 8,510,481 B2 | Page 1 of 1 |
| APPLICATION NO. | : 11/650118 | |
| DATED | : August 13, 2013 | |
| INVENTOR(S) | : Thomas James Wilson et al. | |

It is certified that error appears in the above-identified patent and that said Letters Patent is hereby corrected as shown below:

In the Claims

At column 22, claim 37, line number 13, please delete "wherein the access operation further corn prises a read-" and insert -- wherein the access operation further comprises a read- --.

At column 24, claim 45, line 19, please delete "The computer system of claim 14, wherein the bus" and insert -- The computer system of claim 44, wherein the bus --.

Signed and Sealed this
Twenty-eighth Day of January, 2014

Michelle K. Lee
*Deputy Director of the United States Patent and Trademark Office*